United States Patent
Chandrasekhar et al.

(10) Patent No.: US 12,093,711 B2
(45) Date of Patent: Sep. 17, 2024

(54) HYPERVISOR-ASSISTED SECURITY MECHANISM

(71) Applicant: VMware LLC, Palo Alto, CA (US)

(72) Inventors: Bharath Kumar Chandrasekhar, Palo Alto, CA (US); Leena Shuklendu Soman, Pune (IN); Vasantha Kumar Dhanasekar, Pune (IN)

(73) Assignee: VMware LLC, Palo Alto, CA (US)

( * ) Notice: Subject to any disclaimer, the term of this patent is extended or adjusted under 35 U.S.C. 154(b) by 626 days.

(21) Appl. No.: 17/190,463

(22) Filed: Mar. 3, 2021

(65) Prior Publication Data
US 2022/0214904 A1 Jul. 7, 2022

(30) Foreign Application Priority Data

Jan. 6, 2021 (IN) .............................. 202141000589

(51) Int. Cl.
*G06F 9/455* (2018.01)
*G06F 9/30* (2018.01)
*G06F 9/54* (2006.01)

(52) U.S. Cl.
CPC ...... *G06F 9/45558* (2013.01); *G06F 9/30047* (2013.01); *G06F 9/542* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,935,219 B2* | 1/2015 | Sainath | G06F 16/1744 707/693 |
| 9,396,069 B2* | 7/2016 | Kruglick | H04L 47/125 |
| 10,248,448 B2* | 4/2019 | Beveridge | G06F 9/452 |
| 2015/0088816 A1* | 3/2015 | Kruglick | G06F 11/1402 707/610 |

OTHER PUBLICATIONS

Svard et al. "Evaluation of Delta Compression Techniques for Efficient Live Migration of Large Virtual Machines", ACM 2011, pp. 111-120.*

* cited by examiner

*Primary Examiner* — Van H Nguyen
(74) *Attorney, Agent, or Firm* — King Intellectual Asset Management (57) ABSTRACT

The disclosure provides an approach for hypervisor-assisted security analysis. Embodiments include receiving, at a hypervisor on a host computer, events from one or more virtual computing instances (VCIs). Embodiments include analyzing, by the hypervisor, the events according to one or more rules to identify a subset of the events for additional analysis. Embodiments include compressing, by the hypervisor, the subset of the events by performing deduplication to produce a compressed subset of the events. Embodiments include transmitting, by the hypervisor, the compressed subset of the events over a network to a separate analysis component, wherein the separate analysis component performs the additional analysis.

20 Claims, 5 Drawing Sheets

HYPERVISOR-ASSISTED SECURITY MECHANISM

RELATED APPLICATIONS

Benefit is claimed under 35 U.S.C. 119(a)-(d) to Foreign Application Serial No. 202141000589 filed in India entitled "HYPERVISOR-ASSISTED SECURITY MECHANISM", on Jan. 6, 2021, by VMware, Inc., which is herein incorporated in its entirety by reference for all purposes.

BACKGROUND

A software-defined data center (SDDC) may comprise a plurality of hosts in communication over a physical network infrastructure. Each host is a physical computer (machine) that may run one or more virtualized endpoints such as virtual machines (VMs), containers, and/or other virtual computing instances (VCIs). In some cases, VCIs are connected to software-defined networks, (SDNs) also referred to herein as logical overlay networks, that may span multiple hosts and are decoupled from the underlying physical network infrastructure.

Various events occurring on VCIs may be analyzed for detection of potential security issues, such as malicious attacks. For example, events may be analyzed according to security rules to determine whether an alert should be raised (e.g., if one or more events meet certain conditions associated with potential security issues). Certain existing techniques involve analyzing events occurring on a VCI from within the VCI. However, a drawback of these techniques is that they may result in excessive usage of processing resources of the VCI. Furthermore, these techniques do not allow for application of rules that relate to events occurring across multiple VCIs. For example, a rule may indicate that if the same event occurs on two VCIs within a time period then a potential security issue may be present. Analyzing events only within VCIs does not allow for this type of cross-VCI analysis.

Other techniques involve sending events from VCIs to a remote analysis component, such as a cloud security component, for analysis of the events according to rules. While these techniques reduce load on the VCIs and allow for cross-VCI analysis, they also have certain drawbacks. For example, sending all events from VCIs in a data center to a cloud security component for analysis may require generation of an excessive amount of network traffic, causing congestion and poor network performance. Furthermore, sending all events to a remote analysis component may increase the time required to detect security issues and take remedial action.

Accordingly, there is a need in the art for improved techniques for security analysis of events occurring on VCIs in a data center.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for hypervisor-assisted security analysis in a networking environment. As described in more detail below with respect to FIG. 1, a hypervisor abstracts processor, memory, storage, and networking resources of a host device for multiple virtual computing instances (VCIs) that run concurrently on the same host device. In particular, techniques described herein involve performing analysis of events occurring on VCIs running on a host device at a hypervisor of the host device. Rather than performing all analysis directly on the VCIs or sending all events from VCIs to a remote analysis component such as a cloud security component, embodiments of the present disclosure involve VCIs sending events to the hypervisor, and the hypervisor analyzing the events in order identify potential security issues and/or events that may require further analysis by a remote analysis component. The hypervisor may also perform compression on event data before sending a subset of the events to a remote analysis component for further analysis, such as by collapsing duplicate events and/or duplicate data within events.

Events may include, for example, behavioral events, file events, network events, and the like. Behavioral events generally refer to events that relate to execution of processes (e.g., a process modifying a registry, a process spawning a new process, a process creating a new network connection, and the like). File events generally refer to events that relate to creation, access, modification, and deletion of files (e.g., a user making a change to particular file). Network events generally refer to events that involve network connectivity (e.g., transmission or receipt of a packet, establishment or removal of a network connection, and the like). As used herein, an "event" may refer to a record of an event, such as in a log, or to the event itself.

Techniques described herein reduce processing load on VCIs by utilizing a lightweight "thin agent" on VCIs for capturing events while sending events to the hypervisor for more substantive analysis. Furthermore, by performing event analysis on the hypervisor rather than directly on the VCIs, techniques described herein allow for cross-VCI analysis, such as applying rules that relate to events occurring on multiple VCIs, thereby improving security. Techniques described herein also provide improved security over techniques in which all analysis is performed by a remote analysis component, as actions can be taken to prevent detected security issues more quickly and efficiently when the issues are detected locally by the hypervisor before events are sent over a network. Additionally, by analyzing events at the hypervisor to determine which events warrant additional analysis and by performing compression on event data prior to sending events to a remote analysis component for additional analysis, embodiments of the present disclosure reduce network traffic.

Figure 1:
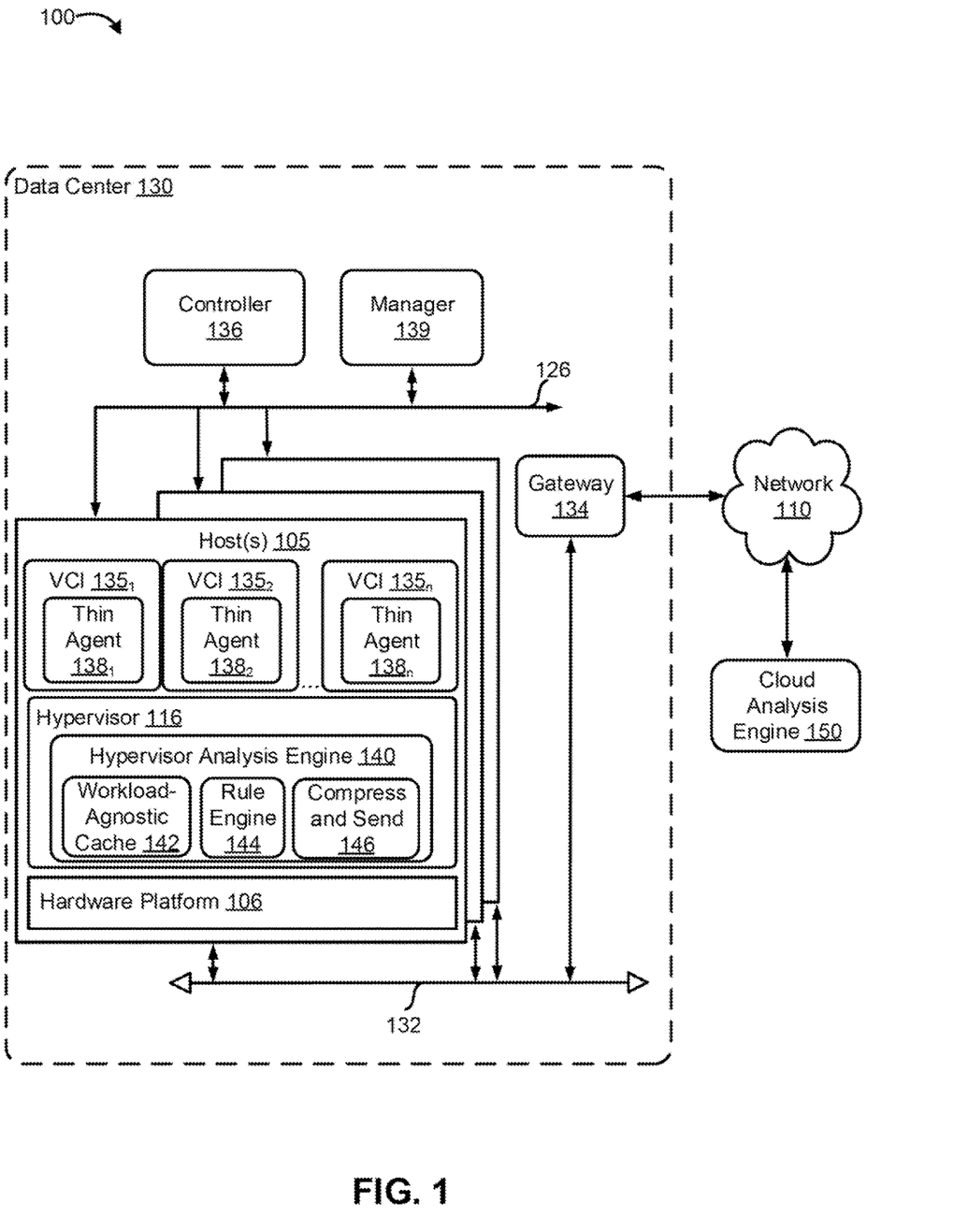
FIG. 1 depicts example physical and virtual network components with which embodiments of the present disclosure may be implemented.

FIG. 1 depicts example physical and virtual network components with which embodiments of the present disclosure may be implemented.

Networking environment 100 includes data center 130 and cloud analysis engine 150 connected to network 110. Network 110 is generally representative of a network of machines such as a local area network ("LAN") or a wide area network ("WAN"), a network of networks, such as the Internet, or any connection over which data may be transmitted.

Cloud analysis engine 150 is a computing entity that performs analysis of events according to rules, such as security policies, in order to detect potential security issues. Cloud analysis engine may run on one or more physical or virtual computing devices. In one example, cloud analysis engine 150 runs on a server computer connected to network 110, while in another embodiment, cloud analysis engine 150 runs on one or more VCIs in a data center connected to network 110 (e.g., the same or a different data center than data center 130).

Data center 130 generally represents a set of networked machines, and may comprise a logical overlay network. Data center 130 includes host(s) 105, a gateway 134, a data network 132, which may be a Layer 3 network, and a management network 126. Host(s) 105 may be an example of machines. For example, a containerized microservice may run directly on a host 105. Data network 132 and management network 126 may be separate physical networks or different virtual local area networks (VLANs) on the same physical network.

It is noted that, while not shown, additional data centers may also be connected to data center 130 via network 110. Communication between the different data centers may be performed via gateways associated with the different data centers.

Each of hosts 105 may include a server grade hardware platform 106, such as an x86 architecture platform. For example, hosts 105 may be geographically co-located servers on the same rack or on different racks. Host 105 is configured to provide a virtualization layer, also referred to as a hypervisor 116, that abstracts processor, memory, storage, and networking resources of hardware platform 106 for multiple virtual computing instances (VCIs) $135_1$ to $135_n$ (collectively referred to as VCIs 135 and individually referred to as VCI 135) that run concurrently on the same host. VCIs 135 may include, for instance, VMs, containers, virtual appliances, and/or the like. VCIs 135 may be an example of machines. For example, a containerized microservice may run on a VCI 135.

VCIs 135 include thin agents $138_1$ to $138_n$ (e.g., collectively referred to as thin agents 138 and individually referred to as thin agent 138). Thin agents 138 collect events occurring on VCIs 135, such as through hooks and/or through other components within a guest operating system (OS) on each VCI 135. In some embodiments, each thin agent 138 resides within the guest OS of a VCI 135. In certain embodiments, a guest monitoring system at each VCI 135 provides the ability to run thin agents 138 in the guest, in an isolated enclave invisible to the guest OS. The guest monitoring system is used to provide a secure channel to communicate with components external to the guest OS, such as hypervisor 116, and to collect a rich set of guest events (e.g., without the guest's knowledge). As such, thin agents 138 are able to feed this rich event data to rule evaluation engines. The guest monitoring system may also provide the functionality of caching verdicts (e.g., determinations of whether an event may indicate a security issue, which may be determined at a thin agent 138, hypervisor analysis engine 140, and/or cloud analysis engine 150) for secure, fast lookups. Thin agents 138 may register policies with hypervisor 116 on first boot, and hypervisor 116 may create normalized policies for VCIs of different types in order to evaluate rules efficiently across VCIs.

Thin agents 138 send events to hypervisor 116 for analysis by hypervisor analysis engine 140. In some embodiments, thin agents 138 perform a "thin" analysis of events, such as applying simple rules that require minimal processing to events in order to detect certain potential security issues and raise alerts as appropriate. For example, rules that involve only a simple threshold comparison may be applied by thin agents 138 so that easily-detectable potential security issues may be detected more quickly. Thin agents 138 are kept lightweight by generally limiting their operations to functionality that can only be performed from within a VCI, such as gathering of data related to events and performing remedial actions within the VCI. Thin agents 138 may perform certain remedial actions when potential security issues are detected. In an example, if an alert is generated (e.g., either within a thin agent 138, by hypervisor analysis engine 140, or by cloud analysis engine 150) indicating that a particular network connection may be a security issue, the thin agent 138 may block the network connection permanently or temporarily.

In certain aspects, hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In certain aspects, hypervisor 116 implements one or more logical entities, such as logical switches, routers, etc. as one or more virtual entities such as virtual switches, routers, etc. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine. In certain embodiments, microservices may run on host 105 without the use of a hypervisor.

Hypervisor 116 comprises hypervisor analysis engine 140 that analyzes events received from VCIs 135. Hypervisor analysis engine 140 may perform rule analysis that is agnostic with respect to the guest operating system (OS) of any given VCI, performs short and time-boxed statistical analysis and other operations that are limited by critical business logic to the hypervisor. In some embodiments, more expansive and large-scale analysis is performed by cloud analysis engine 150 rather than hypervisor analysis engine 140 or thin agents 138.

In an example, thin agents 138 may send events to hypervisor analysis engine 140 for analysis according to rules. Rules used for analysis of events described herein may, for example, be defined by an administrator, such as via manager 139, and may include security policies indicating conditions that indicate potential security issues and/or warrant further analysis. In one example, rules are distributed to hosts 105 from manager 139 via controller 136. Rules may also be transmitted to cloud analysis engine 150 over network 110, such as via gateway 134, and/or may be defined directly on cloud analysis engine 150. In one example, a rule indicates that registry modifications by processes in two different VCIs within a given time window represent a potential security issue. A rule may indicate that when certain conditions occur an alert should be generated and/or further analysis is warranted, such as by cloud analysis engine 150.

Hypervisor analysis engine 140 performs caching of received events in a workload-agnostic cache 142. Workload-agnostic cache 142 decouples endpoint identities from event parameters and uses event parameters as search keys. For example, if events having the same parameters are received from two different VCIs, then the event parameters may be cached in association with identifiers of the two VCIs in one or more cache entries in workload-agnostic cache 142, and one or more of the event parameters may be used as search keys for the cache entries. Workload-agnostic cache 142 allows for deduplication of event data prior to sending events over the network, such as to cloud analysis engine 150. For example, a set of event parameters that was received from multiple VCIs may be sent only once over the network along with the identifiers of the VCIs that sent the set of event parameters.

Hypervisor analysis engine 140 comprises rule engine 144, which analyzes events according to rules. For example, rule engine 144 may receive events from thin agents 138 and may evaluate the events based on rules received from manager 139. If rule engine 144 determines that an alert should be generated based on an application of a rule to one or more events, then rule engine 144 may generate an alert and send the alert to one or more endpoints, such as manager 139 and/or a thin agent 138 capable of taking remedial action based on the alert. If rule engine 144 determines that further analysis is warranted based on an application of a rule to one or more events, then rule engine 144 may compress and send 146 the one or more events to cloud analysis engine 150 for further analysis. Compression of events may involve deduplication of events as well as deduplication of data within events. For example, if two separate events received from the same or different VCIs share common portions (e.g., one or more event parameters with the same values), then the common portion may be sent only once over network 110, and an indication may also be sent that the common portion is part of both of the two separate events.

In an example, events from two different content servers may indicate that the two content servers served the same content to two different endpoints. As such, the portions of the events related to the content that was served is common to the two events, and network traffic may be reduced by sending this common portion of the events only once with an indication that it corresponds to both events. In another example, a load balancer may distribute requests to a set of servers, and all of the servers in the set may have events indicating receipt of the same request from the load balancer (e.g., if a certain content item is frequently requested). Thus, if these events are determined to warrant further analysis, the events from the set of servers may be compressed by sending the event data only once along with identifiers of all of the servers from which the event was received.

In another example, the same event may occur multiple times on a given VCI. As such, the event may be transmitted only once along with an indication of how many times the event occurred on the given VCI.

Gateway 134 provides VCIs 135 and other components in data center 130 with connectivity to network 110, and is used to communicate with destinations external to data center 130, such as user device 150. Gateway 134 may be implemented as one or more VCIs, physical devices, and/or software modules running within one or more hosts 105.

Controller 136 generally represents a control plane that manages configuration of VCIs 135 within data center 130. Controller 136 may be a computer program that resides and executes in a central server in data center 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or virtual computing instances that implement controller functions. Controller 136 is associated with one or more virtual and/or physical CPUs (not shown). Processor(s) resources allotted or assigned to controller 136 may be unique to controller 136, or may be shared with other components of data center 130. Controller 136 communicates with hosts 105 via management network 126.

Manager 139 represents a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, manager 139 is a computer program that executes in a central server in networking environment 100, or alternatively, manager 139 may run in a VM, e.g. in one of hosts 105. Manager 139 is configured to receive inputs from an administrator or other entity, e.g., via a web interface or API, and carry out administrative tasks for data center 130, including centralized network management and providing an aggregated system view for a user. In some embodiments, a user defines rules via manager 139 for distribution to hypervisor analysis engine 140, cloud analysis engine 150, and/or thin agents 138 for use in analyzing events as described herein.

Cloud analysis engine 150 performs high-level analysis of events received from hypervisor analysis engine 140. Cloud analysis engine 150 may be able to perform more extensive analysis due to potentially larger amounts of available processing resources and/or due to a higher-level view of events across data center 130 and/or additional data centers. For instance, cloud analysis engine 150 may be able to apply rules that relate to events occurring on separate hosts 105 and/or separate data centers, as it is not located within a single host 105. Cloud analysis engine 150 may also analyze events over longer periods of time. For example, if hypervisor analysis engine 140 determines that a potential security issue exists based on analyzing events from a smaller time period, hypervisor analysis engine 140 may cause the appropriate thin agent 138 to temporarily suspend one or more processes or connections (and/or, in some embodiments, cause the appropriate thin agent 138 to collect a larger number of events related to the potential security issue to achieve a higher-confidence confirmation that a security issue exists) and may send the events along with additional events over a longer time period to cloud analysis engine 150 for a more extensive analysis. If cloud analysis engine 150 determines based on the more extensive analysis that a security issue does not exist, cloud analysis engine 150 may send a message to the appropriate thin agent 138 (e.g., directly or via hypervisor 116) to end the temporary suspension. Alternatively, if cloud analysis engine 150 determines that a potential security issue does exist based on the more extensive analysis, then cloud analysis engine 150 may generate an alert, and the appropriate thin agent 138 may permanently block the process or connection.

Generally, cloud analysis engine 150 analyzes events according to rules and generates alerts when appropriate.

Alerts generated by cloud analysis engine 150 may be sent to various endpoints, such as manager 139, hypervisor analysis engine 140, and/or thin agents 138. Due to compression performed by hypervisor analysis engine 140, described above, cloud analysis engine 150 is able to utilize less processing resources by analyzing events and portions of events together. For example, if the same event occurred on multiple VCIs, then cloud analysis engine 150 receives the compressed version of the events (e.g., one copy of the event data with identifiers of the VCIs on which the event occurred) and analyzes the events together (e.g., applying rules to the event once and applying the verdict to all of the events rather than applying rules to each event separately).

Figure 2:
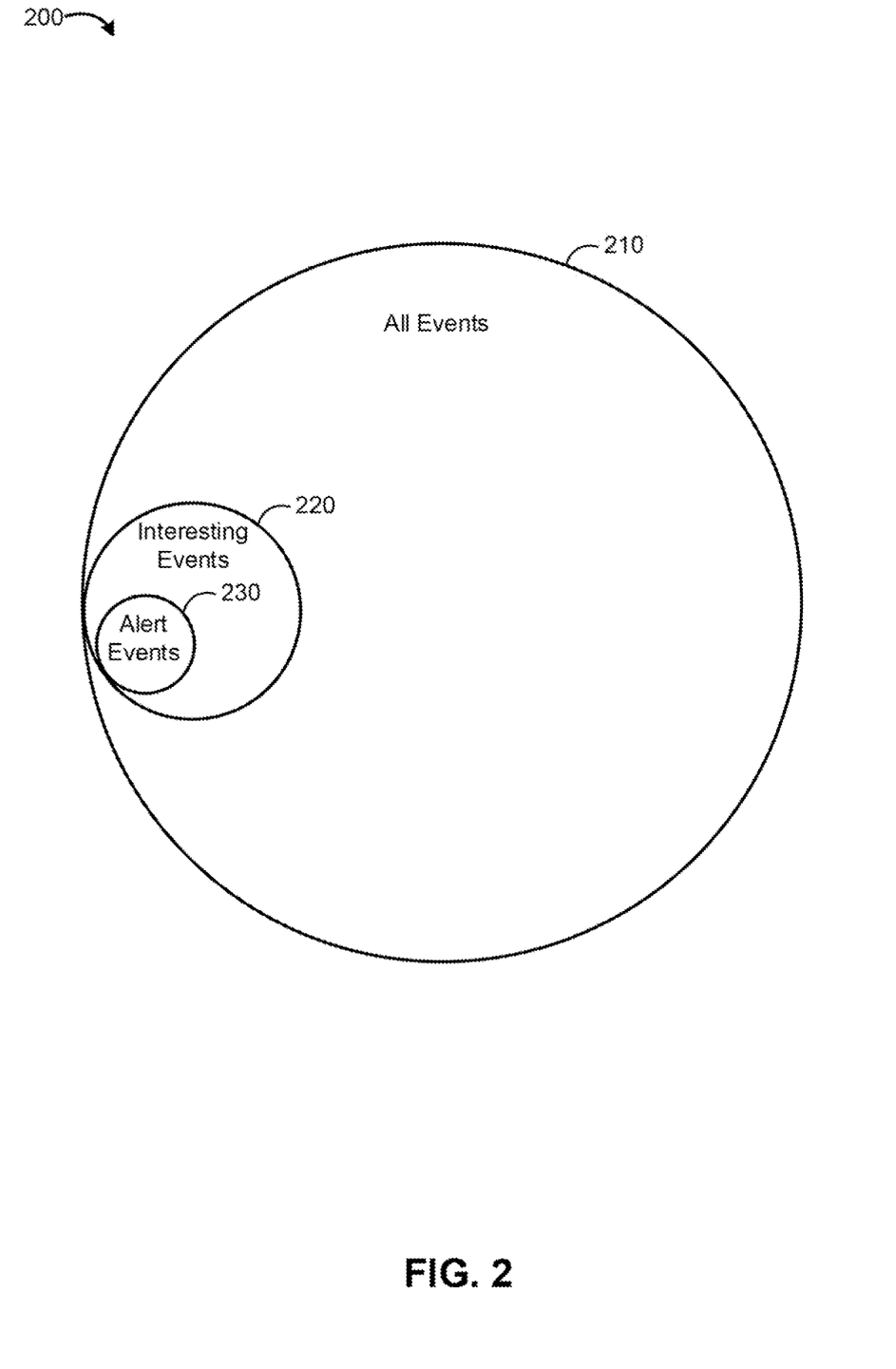
FIG. 2 is an illustration of types of events occurring in a data center.

FIG. 2 is an illustration 200 of types of events occurring in a data center.

All events 210 illustrates the entire set of events collected from a plurality of endpoints, such as from VCIs 135 of FIG. 1. Certain existing techniques involve all events 210 being transmitted over a network to a cloud analysis component for rule-based analysis. Due to the potentially large number of events in all events 210, these techniques may result in a large amount of network traffic.

Interesting events 220 includes a subset of all events 210, such as those indicated by rules to warrant further analysis and, in some cases, alerts. Interesting events 220 may include a significantly smaller number of events than all events 210. As such, techniques described herein involve identifying interesting events 220 at the hypervisor so that only those events identified as interesting may be sent to a cloud analysis component, thereby significantly reducing network traffic.

Alert events 230 includes a subset of interesting events 220 that result in alerts. For example, alert events 230 may be events that, after being analyzed according to one or more rules, result in alerts being generated, either at a VCI, the hypervisor, or a cloud analysis component. By performing some rule analysis at the hypervisor, rather than performing all rule analysis in the cloud, embodiments of the present disclosure allow alert events 230 to be identified more quickly so that remedial action may be taken more efficiently and/or to avoid sending excessive data over a network.

Figure 3:
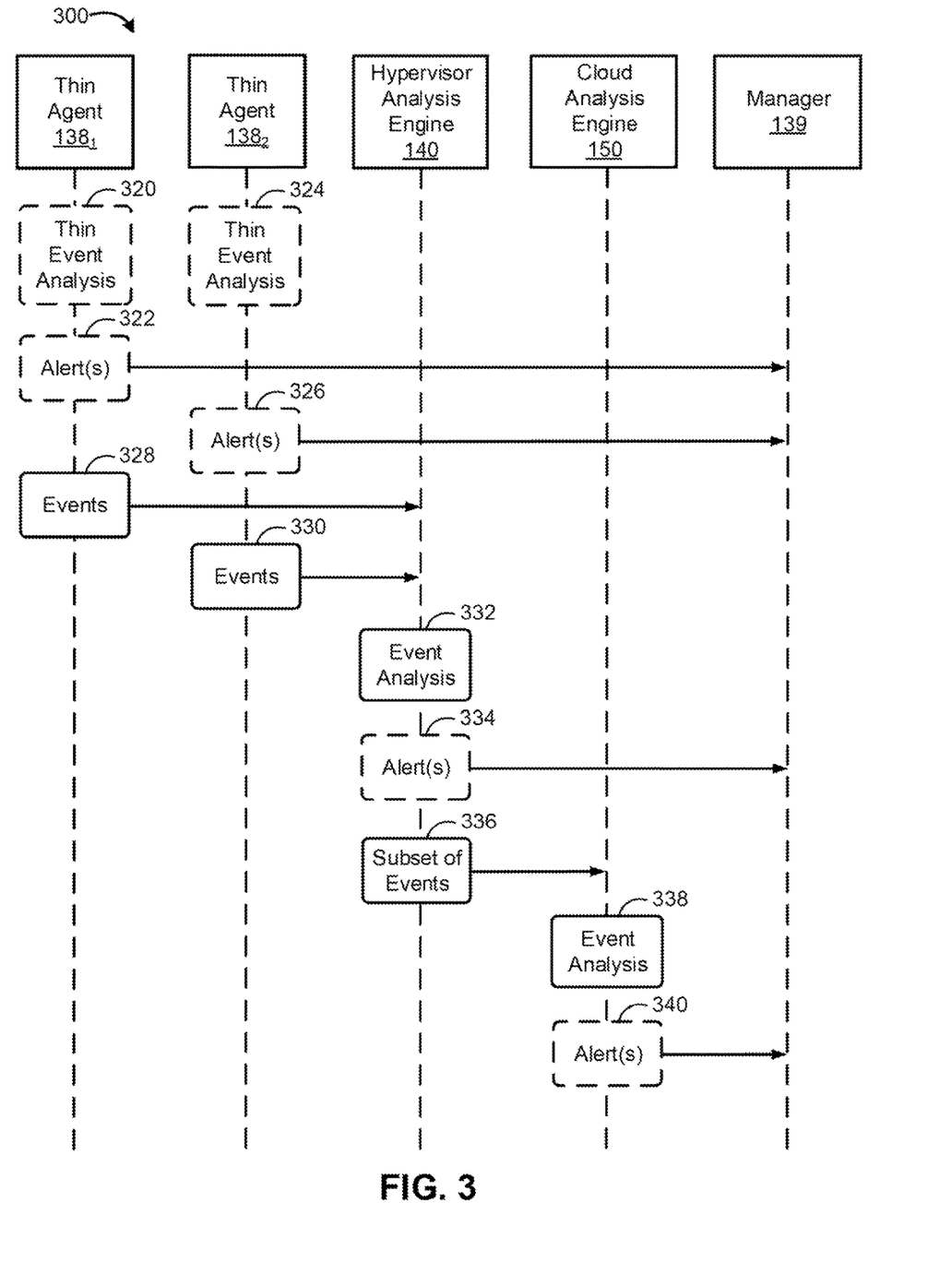
FIG. 3 depicts an example exchange of messages between components related to hypervisor-assisted security analysis.

FIG. 3 is a flow diagram 300 depicting an exchange of messages between components related to hypervisor-assisted security analysis. Flow diagram 300 includes thin agents $138_1$ and $138_2$, hypervisor analysis engine 140, cloud analysis engine 150, and manager 139 of FIG. 1.

At 320, thin agent $138_1$ performs an optional thin event analysis, such as applying basic rules (e.g., simple thresholds, counters, and/or the like) to events occurring on VCI $135_1$ of FIG. 1. Likewise, at 324, thin agent $138_2$ performs an optional thin event analysis of events occurring on VCI $135_2$ of FIG. 1.

At 322 and 326, respectively, thin agents optionally generate alerts based on this analysis 320 and/or 324. Alerts 322 and 326 are optionally provided to manager 139, and may also or alternatively be provided to one or more additional endpoints. Furthermore, thin agents $138_1$ and/or $138_2$ may take remedial actions corresponding to alerts 322 and/or 326, such as blocking one or more processes or connections either temporarily or permanently.

At 328 and 330, respectively, thin agents $138_1$ and $138_2$ send events to hypervisor analysis engine 140. The events sent at 328 and 330 may include, for example, all events occurring on VCIs $135_1$ and $135_2$ of FIG. 1.

At 332, hypervisor analysis engine 140 performs event analysis of the events received at 328 and 330. In some embodiments, the event analysis involves applying one or more rules in order to determine whether to generate alerts and/or to send events to cloud analysis engine 150 for further analysis.

At 334, hypervisor analysis engine 140 optionally generates one or more alerts based on the event analysis at 332, and optionally sends the one or more alerts to manager 139 (and/or other endpoints). In some embodiments, alerts 334 may also be provided to one or more of thin agents $138_1$ and $138_2$ so that remedial actions may be performed based on the alerts.

At 336, a subset of the events received at 328 and 330 is sent to cloud analysis engine 150 for further analysis. The subset of events may include events determined to warrant further analysis based one the event analysis at 332. The subset of events may also have been compressed by hypervisor analysis engine 140 as described herein, such as through deduplication of events and/or portions of events. In some embodiments, the subset of events may also be encrypted before transmission over the network for security purposes.

At 338, cloud analysis engine 150 performs event analysis on the subset of events, such as based on one or more rules. The event analysis performed by cloud analysis engine 150 may be higher-level and/or more extensive than the event analysis performed by hypervisor analysis engine 140.

At 340, cloud analysis engine 150 optionally generates one or more alerts based on the event analysis performed at 338, and optionally sends the alerts to manager 139 and/or one or more additional endpoints. In some embodiments, the alerts are sent to one or more of thin agents $138_1$ and $138_2$ so that remedial actions may be performed based on the alerts.

It is noted that the components and messages shown in FIG. 3 are included as examples, and other sets of fewer or more components and messages may be used to perform operations described herein.

Figure 4:
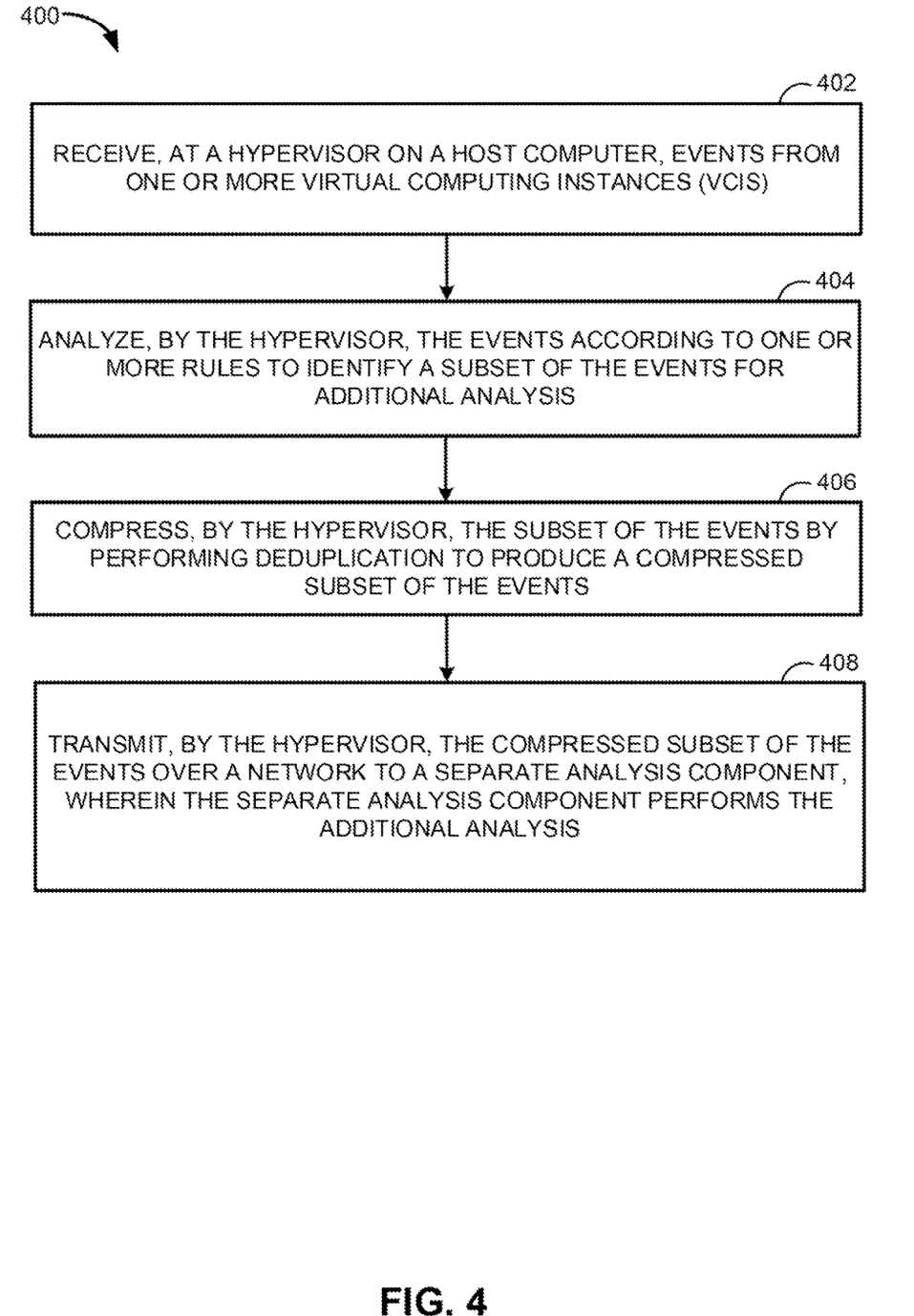
FIG. 4 depicts example operations for hypervisor-assisted security analysis.

FIG. 4 depicts example operations 400 for hypervisor-assisted security analysis. For example, operations 400 may be performed by hypervisor analysis engine 140 of FIG. 1 and/or one or more other components in networking environment 100 of FIG. 1.

At step 402, a hypervisor on a host computer receives events from one or more VCIs. For example the hypervisor may receive a first set of the events from a first VCI of the one or more VCIs and receive a second set of the events from second VCI of the one or more VCIs. The hypervisor may generate one or more entries in a cache based on the events, the one or more entries in the cache being searchable based on one or more event parameters.

At step 404, the hypervisor analyzes the events according to one or more rules to identify a subset of the events for additional analysis. The one or more rules may include a rule involving cross-VCI analysis, such as a rule that relates the occurrence of one or more events on multiple VCIs. The hypervisor may generate an alert based on analyzing the events according to the one or more rules, and may provide the alert to at least one of the one or more VCIs. The at least one of the one or more VCIs may performs a remedial action based on the alert. Furthermore, the hypervisor may provide the alert to a management component and/or one or more additional endpoints.

At step 406, the hypervisor compresses the subset of the events by performing deduplication to produce a compressed subset of the events. Compression may include, for example, identifying a plurality of duplicates of a given event within the subset of the events and including the given event only once within the compressed subset of the events.

In some embodiments, the given event is associated in the compressed subset of the events with one or more VCI identifiers and/or an indication of a number of occurrences of the given event on a given VCI. Compression may also comprise identifying a plurality of events within the subset of the events that include an identical portion and including the identical portion only once within the compressed subset of the events. An indication may be included in the compressed subset of the events that the identical portion is associated with the plurality of events.

At step 408, the hypervisor transmits the compressed subset of the events over a network to a separate analysis component, wherein the separate analysis component performs the additional analysis.

Figure 5:
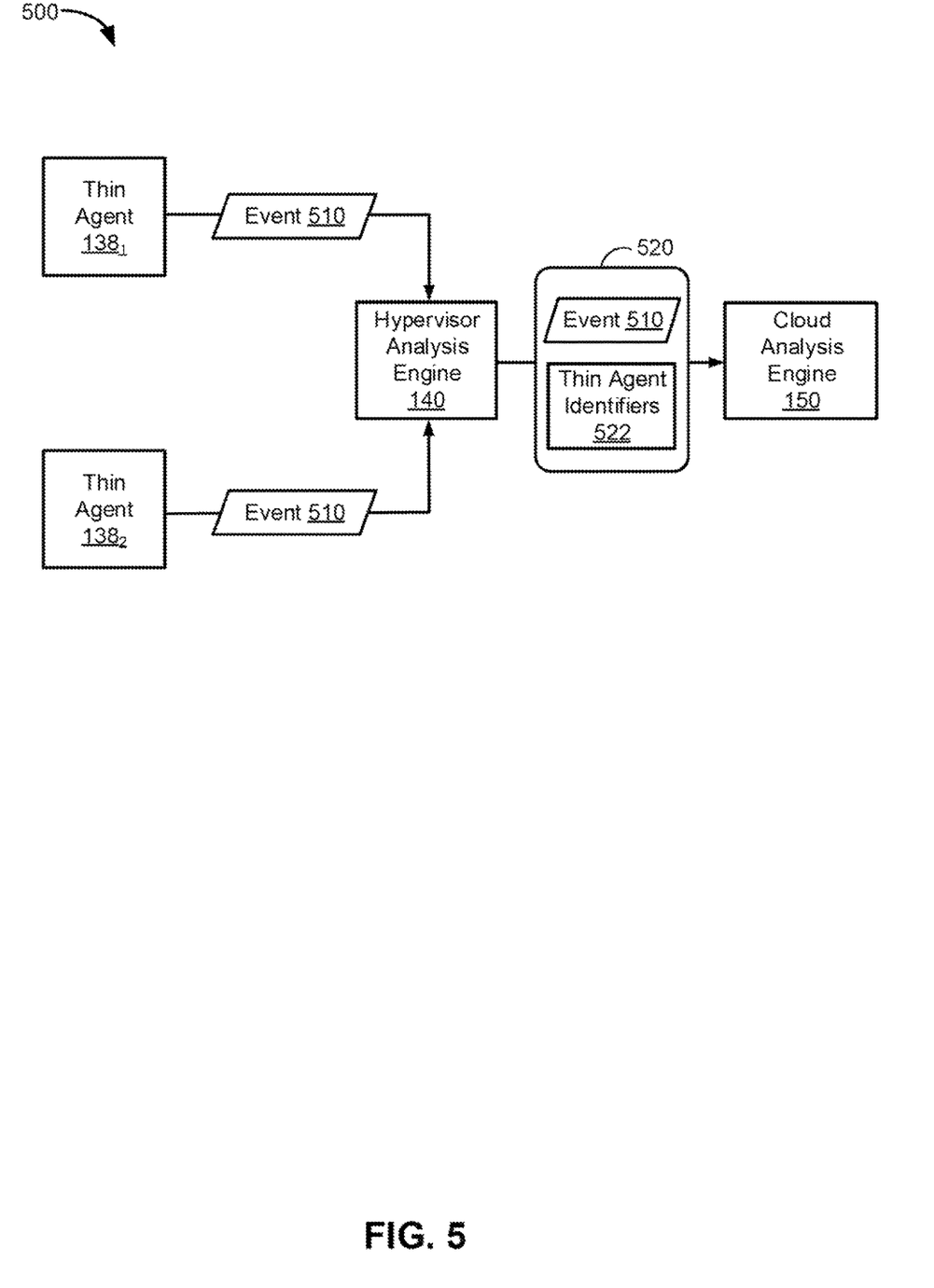
FIG. 5 depicts an example of data compression related to hypervisor-assisted security analysis.

FIG. 5 is an illustration 500 of data compression related to hypervisor-assisted security analysis. Illustration 500 includes thin agents 138$_1$ and 138$_2$, hypervisor analysis engine 140, and cloud analysis engine 150 of FIG. 1.

Thin agents 138$_1$ and 138$_2$ both send the same event 510 to hypervisor analysis engine 140, such as after event 510 occurs on both thin agents 138$_1$ and 138$_2$. In an example, event 510 may be related to launch of a particular application that was launched on both VCIs 135$_1$ and 135$_2$ of FIG. 1. Thin agents 138$_1$ and 138$_2$ may, for example, buffer events as they occur and send events to hypervisor analysis engine 140 every time a certain number of events have been buffered (e.g., a small number for lightweight transmission) or at regular time intervals.

Hypervisor analysis engine 140 may, for example, analyze events 510 (individually or together) according to one or more rules, and determine that events 510 warrant further analysis by cloud analysis engine 150.

In some embodiments, hypervisor analysis engine 140 buffers events determined to warrant further consideration, and transmits events to cloud analysis engine 150 every time a certain number of events have been buffered (e.g., a larger number than those buffered at the thin agents because there is no expectation of immediate action to be taken by cloud analysis engine 150) or at regular time intervals. Hypervisor analysis engine 140 compresses events 510 to produce compressed event data 520, which includes one copy of event 510 along with thin agent identifiers 522 of the two thin agents 138$_1$ and 138$_2$ from which event 510 was received. Thus, event 510 is only transmitted over the network once, along with the thin agent identifiers, rather than twice. When cloud analysis engine 150 receives compressed event data 520, it is able to perform a more efficient analysis by only analyzing event 510 once and applying the verdict of the analysis to both instances of event 510 that occurred on thin agents 138$_1$ and 138$_2$.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and/or the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of hypervisor-assisted security analysis, comprising:
    receiving, at a hypervisor on a host computer, events from one or more virtual computing instances (VCIs);
    analyzing, by the hypervisor, the events according to one or more rules to identify a subset of the events for additional analysis;
    compressing, by the hypervisor, the subset of the events by performing deduplication to produce a compressed subset of the events, wherein compressing the subset of events comprises:
        identifying, by the hypervisor, a plurality of duplicates of a given event within the subset of the events; and
        including, by the hypervisor, the given event only once within the compressed subset of the events; and
    transmitting, by the hypervisor, the compressed subset of the events over a network to a separate analysis component, wherein the separate analysis component performs the additional analysis.

2. The method of claim 1, wherein compressing the subset of the events comprises:
    identifying, by the hypervisor, a plurality of events within the subset of the events that include an identical portion; and
    including, by the hypervisor, the identical portion only once within the compressed subset of the events.

3. The method of claim 2, wherein the plurality of events comprise a first event from a first VCI and a second event from a second VCI.

4. The method of claim 1, wherein:
    receiving the events from the one or more virtual computing instances (VCIs) comprises:
        receiving a first set of the events from a first VCI of the one or more VCIs; and
        receiving a second set of the events from second VCI of the one or more VCIs; and
        the one or more rules comprise a rule involving cross-VCI analysis.

5. The method of claim 1, further comprising generating, by the hypervisor, an alert based on analyzing the events according to the one or more rules.

6. The method of claim 5, further comprising providing, by the hypervisor, the alert to at least one of the one or more VCIs, wherein the at least one of the one or more VCIs performs a remedial action based on the alert.

7. The method of claim 1, further comprising generating, by the hypervisor, one or more entries in a cache based on the events, wherein the one or more entries in the cache are searchable based on one or more event parameters.

8. A system for hypervisor-assisted security analysis, comprising:
    at least one memory; and
    at least one processor coupled to the at least one memory, the at least one processor and the at least one memory configured to:
    receive, at a hypervisor on a host computer, events from one or more virtual computing instances (VCIs);
    analyze, by the hypervisor, the events according to one or more rules to identify a subset of the events for additional analysis;
    compress, by the hypervisor, the subset of the events by performing deduplication to produce a compressed subset of the events, wherein compressing the subset of events comprises:
        identifying, by the hypervisor, a plurality of duplicates of a given event within the subset of the events; and
        including, by the hypervisor, the given event only once within the compressed subset of the events; and
    transmit, by the hypervisor, the compressed subset of the events over a network to a separate analysis component, wherein the separate analysis component performs the additional analysis.

9. The system of claim 8, wherein compressing the subset of the events comprises:
    identifying, by the hypervisor, a plurality of events within the subset of the events that include an identical portion; and
    including, by the hypervisor, the identical portion only once within the compressed subset of the events.

10. The system of claim 8, wherein:
    receiving the events from the one or more virtual computing instances (VCIs) comprises:
    receiving a first set of the events from a first VCI of the one or more VCIs; and
    receiving a second set of the events from second VCI of the one or more VCIs; and
    the one or more rules comprise a rule involving cross-VCI analysis.

11. The system of claim 8, wherein the at least one processor and the at least one memory are further configured to generate, by the hypervisor, an alert based on analyzing the events according to the one or more rules.

12. The system of claim 11, wherein the at least one processor and the at least one memory are further configured to provide, by the hypervisor, the alert to at least one of the one or more VCIs, wherein the at least one of the one or more VCIs performs a remedial action based on the alert.

13. The system of claim 8, wherein the at least one processor and the at least one memory are further configured to generate, by the hypervisor, one or more entries in a cache based on the events, wherein the one or more entries in the cache are searchable based on one or more event parameters.

14. A non-transitory computer-readable medium storing instructions that, when executed by one or more processors, cause the one or more processors to:
- receive, at a hypervisor on a host computer, events from one or more virtual computing instances (VCIs);
- analyze, by the hypervisor, the events according to one or more rules to identify a subset of the events for additional analysis;
- compress, by the hypervisor, the subset of the events by performing deduplication to produce a compressed subset of the events, wherein compressing the subset of events comprises:
  - identifying, by the hypervisor, a plurality of duplicates of a given event within the subset of the events; and
  - including, by the hypervisor, the given event only once within the compressed subset of the events; and
- transmit, by the hypervisor, the compressed subset of the events over a network to a separate analysis component, wherein the separate analysis component performs the additional analysis.

15. The non-transitory computer-readable medium of claim 14, wherein compressing the subset of the events comprises:
- identifying, by the hypervisor, a plurality of events within the subset of the events that include an identical portion; and
- including, by the hypervisor, the identical portion only once within the compressed subset of the events.

16. The non-transitory computer-readable medium of claim 14, wherein:
- receiving the events from the one or more virtual computing instances (VCIs) comprises:
  - receiving a first set of the events from a first VCI of the one or more VCIs; and
  - receiving a second set of the events from second VCI of the one or more VCIs; and
- the one or more rules comprise a rule involving cross-VCI analysis.

17. The non-transitory computer-readable medium of claim 14, wherein the instructions, when executed by the one or more processors, further cause the one or more processors to generate, by the hypervisor, an alert based on analyzing the events according to the one or more rules.

18. The non-transitory computer-readable medium of claim 17, wherein the instructions, when executed by the one or more processors, further cause the one or more processors to provide, by the hypervisor, the alert to at least one of the one or more VCIs, wherein the at least one of the one or more VCIs performs a remedial action based on the alert.

19. The non-transitory computer-readable medium of claim 14, wherein the instructions, when executed by the one or more processors, further cause the one or more processors to generate one or more entries in a cache based on the events, wherein the one or more entries in the cache are searchable based on one or more event parameters.

20. The non-transitory computer-readable medium of claim 14, wherein the plurality of events comprise a first event from a first VCI and a second event from a second VCI.

* * * * *